United States Patent Office 3,316,296
Patented Apr. 25, 1967

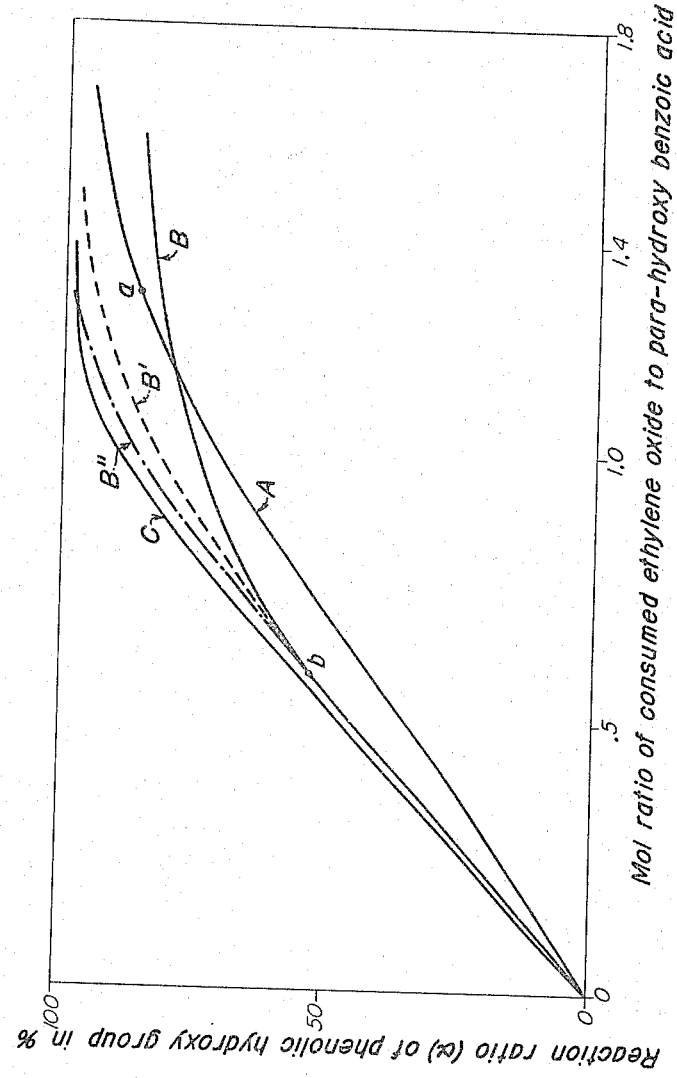

3,316,296
METHOD FOR THE MANUFACTURE OF PARA-(β-HYDROXYETHOXY) BENZOIC ACID
Keisuke Mihara, Saeki, Oita, Japan, assignor to Polyester-ether Development Co., Ltd., Tokyo, Japan
Filed June 10, 1963, Ser. No. 286,805
3 Claims. (Cl. 260—521)

This invention relates to a method for the manufacture of para-(β-hydroxyethoxy) benzoic acid with a high yield and in a highly pure state usable for the manufacture of highly polymeric substances by reacting para-hydroxy benzoic acid with a compound selected from ethylene oxide and ethylene chlorohydrin in the presence of an aqueous alkaline solution at an elevated temperature by adding at least one selected from acidic and basic substances for maintaining pH of said solution within the range of from 9.0 to 11.5 during their reaction thereby to form an alkali salt of para-(β-hydroxyethoxy) benzoic acid, and separating para-(β-hydroxyethoxy) benzoic acid from said solution by adding at least one acidic substance for the neutralization of said aqueous alkaline solution.

An object of this invention is to provide a method for the manufacture of para-(β-hydroxyethoxy) benzoic acid by selectively reacting a compound selected from ethylene oxide and ethylene chlorohydrin with a phenolic hydroxy group contained in para-hydroxy benzoic acid for preventing side reactions as illustrated later and thus reducing the amount of reactants to be consumed to a minimum.

Another object of this invention is to provide a method for the manufacture of highly pure para-(β-hydroxyethoxy) benzoic acid safe from contamination and easy for purification.

Hitherto, there have been proposed methods for the manufacture of hydroxyethoxy aromatic acids by reacting hydroxy aromatic acid with an hydroxyethylation agent in the presence of an aqueous alkaline solution by slowly adding said hydroxyethylation agent into said oxyaromatic acid. By using such a method, however, para-(β-hydroxyethoxy) benzoic acid can not be manufactured with a high yield and in a highly pure state suitable for use in the production of highly polymeric substances. The inventor has found the fact that when such a method is used, the hydroxyethylation agent such as ethylene oxide and ethylene chlorohydrin must be used in the amount of above 1.55 mols per 1 mol of para-hydroxy benzoic acid for obtaining para-(β-hydroxyethoxy) benzoic acid with a high yield of above 95 percent, and also said hydroxyethylation agent must be used in the amount of about 2 mols per 1 mol of para-hydroxy benzoic acid for obtaining para-(β-hydroxyethoxy) benzoic acid with a high yield of 98 to 99 percent. However, those known methods are not only expensive but also unfavorable in the viewpoint of purity of the product, because hydroxyethylation agent is used in so much excess that side reaction products were produced which contaminate para-(β-hydroxyethoxy) benzoic acid, deteriorating its yield and purity.

This invention is intended to overcome these disadvantages inherent in the prior art of manufacture of the hydroxyethoxy aromatic acids and has been attained as the result of researches to achieve the aforesaid objects. For a better understanding of the nature and objects of this invention, reference should be made to the following detailed description in connection with accompanying figure.

The underlying principle of this invention is illustrated by using ethylene oxide as a hydroxyethylation agent through the conventional method for the oxyethylation of hydroxy aromatic acid. It should be understood, however, that the same principle holds good in cases when other hydroxyethylation agents are used.

The curve A in the accompanying figure shows the relationship between the mol ratio of ethylene oxide, which is consumed during the reaction, to para-hydroxy benzoic acid and the reaction ratio α in percent of phenolic hydroxy group contained in para-hydroxy benzoic acid in the case of slowly reacting ethylene oxide with 1 mol of para-hydroxy benzoic acid dissolved in an aqueous solution containing 20 mols of water and 1.05 mol equivalents of sodium hydroxide at a temperature of 80° C. The curve B in the accompanying figure shows the similar relationship between the mol ratio of ethylene oxide, which is consumed during the reaction, to para-hydroxy benzoic acid and the reaction ratio α in percent of phenolic hydroxy group contained in para-hydroxy benzoic acid in the case of slowly reacting ethylene oxide with 1 mol of para-hydroxy benzoic acid dissolved in an aqueous solution containing 20 mols of water and 1.50 mol equivalents of sodium hydroxide at a temperature of 80° C. 1.4 mols of ethylene oxide reacts with para-hydroxy benzoic acid on the same reaction conditions mentioned above and the reaction mixture is neutralized with acid to form a precipitate and then the precipitate is recrystalized by using water. The following Table 1 shows the yield and the melting point of the resulting para-(β-hydroxyethoxy) benzoic acid.

TABLE 1

| Signs of Experiments | Mols of NaoH used | Values of pH of the reaction mixture at— | | | Yields of para-(β-hydroxy-ethoxy) benzoic acid (percent) | Melting points of para-(β-hydroxy-ethoxy) benzoic acid (° C.) |
|---|---|---|---|---|---|---|
| | | The initial stage of reaction | The bend point a of the curve A or the bend point b of the curve B in figure | The final stage of reaction | | |
| A | 1.05 | 7.5 | 11.0 | 11.0 | 86 | 175 |
| B | 1.50 | 8.5 | 11.5 | Above 13 | 82 | 178 |
| B″ | 1.50 | 8.5 | | 10.5 | 95 | 180 |

As seen from the accompanying figure, the curve B shows that the consumption of ethylene oxide which reacts with phenolic hydroxy group contained in para-hydroxy benzoic acid is larger than the consumption of ethylene oxide as shown in the curve A in the initial stage of the reaction but this relation becomes reverse toward the final stage of the reaction.

And also, both curves A and B have the considerable bend points a and b respectively and the bend points come out earlier as the amount of sodium hydroxide increases.

As seen from Table 1, the value of pH of the reaction mixture increase with the proceeding of the reaction.

It was greatly interesting to find as the result of experiments that the bend points a and b indicated substantially the same pH value within the range of 11.0 to 11.5 as shown in Table 1.

The reasons for the increase in the pH value in the proceeding of the reaction for the production of para-(β- ydroxyethoxy) benzoic acid can be understood by referring to the following chemical Equations 1, 2 and 3.

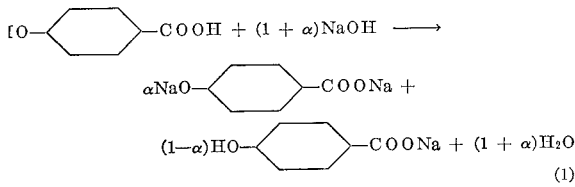

(Note α is the numerical value between zero and 1.)

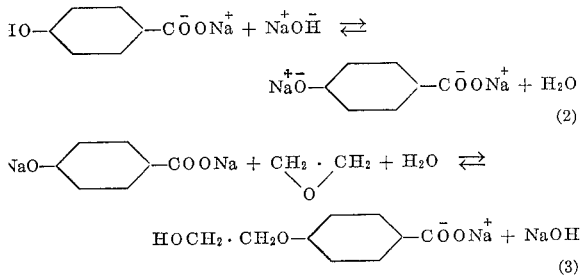

As shown in the Equation 1, para-hydroxy benzoic acid at first reacts with sodium hydroxide to produce disodium salt and monosodium salt in the state of chemical equilibrium as shown in the Equation 2 but such a chemical equilibrium is broken in the presence of sodium hydroxide which comes from the Equation 3 showing the production of sodium salt of para-($\beta$-hydroxyethoxy) benzoic acid and thus the reaction of the Equation 2 proceeds to the right hand side producing disodium salt. Such being this reaction, phenolic hydroxy group of para-hydroxy benzoic acid is oxyethylated by the action of ethylene oxide and therefore the amount of phenolic hydroxy group decreases while the amount of sodium hydroxide does not decrease in the reaction mixture in the proceeding of the reaction for production of para-($\beta$-hydroxyethoxy) benzoic acid.

Now, the inventor has found the fact that the reaction of para-hydroxy benzoic acid with the hydroxyethylation agent includes the considerable side reactions as shown in the following chemical Equations 4, 5 and 6.

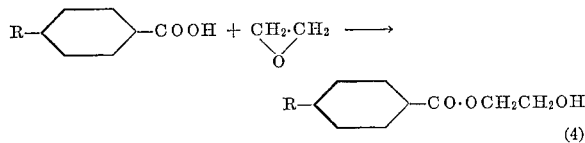

(Note: R represents —OH or —OCH$_2$CH$_2$OH)

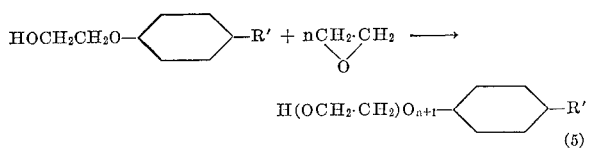

(Note: R' represents —COOH or —COOCH$_2$CH$_2$OH)

(Note: n is an integer not containing zero)

Further, the inventor has found the fact that the reactions as shown in the chemical Equations 3, 4, 5 and 6 are influenced by the pH value of the reaction mixture and that in such reactions the amount of ethylene oxide to be consumed for each of the reactions varies as the pH value of the reaction mixture changes in the proceeding of reaction.

Still, further, the inventor has found the fact that generally the main reactions as shown in the chemical Equations 1, 2 and 3, becomes more rapid in proceeding as the pH value of the reaction mixture becomes higher than 8.0, and the reaction as shown in the chemical Equation 4 proceeds at a considerable rate in the reaction mixture having a pH value within the range of 5 to 13; and the reaction as shown in the chemical Equation 5 proceeds rapidly as the pH of the reaction mixture is higher than 11; and the reaction as shown in the chemical Equation 6 proceeds at a relatively slow rate in the reaction mixture having a pH value within the range of 7 to 10 but at a high rate in the reaction mixture having the pH value above 11.

Thus, the curves A and B as shown in the accompanying figure can be understood as follows:

The curve A shows that the consumption ratio of ethylene oxide is small; in other words, ethylene oxide is consumed in the side reactions 4 and 6 because the reaction as the pH value of the reaction mixture is low, or Equation 3 is slow either at the early stage of the reaction as the pH value of the reaction mixture is low, or at the final stage of the reaction as the amount of phenolic hydroxy group in the reaction mixture is small.

And the curve B shows that the consumption of ethylene oxide is rather larger at the early stage of reaction; in other words, ethylene oxide is not consumed so much in the side reactions as in the case of the reaction shown by the curve A because the pH value of the reaction mixture is sufficiently high at the early stage of reaction. However, the bend point b of the curve B shows that the amount of phenolic hydroxy group in the reaction mixture is reduced and ethylene oxide is consumed in the side reactions 5 and 6 which become rapid by the increasing of pH value of the reaction mixture and therefore ethylene oxide becomes wasted.

As seen from the discussion above it is important to keep the pH value within the range as defined hereinunder during the reaction through from the initial stage to the final stage.

The following Table 2 shows the results obtained by reacting 1 mol of para-hydroxy benzoic acid with 1.4 mols of ethylene oxide in an aqueous alkaline solution containing 20 mols of water and sodium hydroxide in the amount required for the pH listed in Table 2 at the temperature of 80° C., maintaining the pH value of said solution constant by adding sulphuric acid thereto.

TABLE 2

| Constantly-maintained pH values of the reaction mixture | Yields of para-($\beta$-hydroxyethoxy) benzoic acid (percent) | Melting points of para-($\beta$-hydroxyethoxy) benzoic acid (° C.) |
|---|---|---|
| 9.0 | 78 | 175 |
| 9.5 | 86 | 179 |
| 10.0 | 94 | 180 |
| 11.0 | 94 | 180 |
| 11.5 | 88 | 179 |
| 12.0 | 67 | 176 |

As seen from Table 2, the oxyethylation of para-hydroxy benzoic acid by the hydroxyethylation agents in accordance with this invention can preferably be carried out in an aqueous alkaline solution having a pH value within the range of from 9.5 to 11.5, especially from 10.0 to 11.0. In other words, it is preferable that the aqueous alkaline solution does not contain the free alkalies in excess of an amount required for the formation of di-alkali salt of p-hydroxy benzoic acid and monoalkali salt of para-($\beta$-hydroxyethyoxy) benzoic acid during the hydroxyethylation reaction.

In an embodiment of this invention, a reaction is started with a solution containing 1 mol para-hydroxy benzoic acid, 1.1–2.0 mol equivalent of caustic alkalies and 8 to 50 mols of water per 1 mol of para-hydroxy benzoic acid.

Again reference will be made to the curve B in the accompanying figure as mentioned above. If ethylene oxide is successively added to the reaction mixture without controlling the pH value of said reaction mixture after passing the bend point b, said ethylene oxide is consumed in the side reactions and hence it scarcely attains 100% of the reaction ratio of phenolic hydroxy group even by using a large excess of ethylene oxide and also it cannot obtain highly pure para-(β-hydroxyethoxy) benzoic acid. In accordance with this invention, the pH value of the reaction mixture at the bend point b are controlled to the range of 9.5 to 11.5, preferably 10.0 to 11.0 by adding acidic substance, for example, such as sulphuric acid. In this case, the reaction proceeds along the curve B' as shown in the accompanying figure and the reaction ratio of phenolic hydroxy group reaches 95% after 1.3 mols of ethylene oxide was used. The curve B' shows that this invention has the advantageous effect over the curves A and B. Also, the curve B" as shown in the accompanying figure shows the result of the reaction carried out by maintaining the pH value of the reaction mixture at 10.5 and the curve B" gives a more advantageous effect over the curve B'. In such reaction, the reaction ratio of phenolic hydroxy group reaches 95% in the case of the consumption of 1.15 mols of ethylene oxide and 98.5% in the case of the consumption of 1.3 mols of ethylene oxide in which the yield of para-(β-hydroxyethoxy) benzoic acid is shown in Table 1, Sign B".

It is necessary to add an acidic substance for controlling the pH value within the range of 10 to 11 of the reaction mixture during the reaction when 1 mol of para-hydroxy benzoic acid and 2 mols equivalents of caustic alkali are used at the initial stage of the reaction. In this case, the reaction proceeds along the curve C which gives the best result. To select the reaction on curve B" or C, depends on the cost of the caustic alkalies to be used.

In this invention, ethylene chlorohydrin may also be used as an hydroxyethylation agent in the same principle as in the case of using ethylene oxide because ethylene chlorohydrin can be converted into ethylene oxide and alkali metal chloride by reacting with caustic alkali. Ethylene chlorohydrin must be used in an amount in excess of the amount required for the oxyethylation of phenolic hydroxy group of para-hydroxy benzoic acid and the amount of ethylene chlorohydrin in the reaction mixture must be larger than the amount of caustic alkali which gets into the reaction mixture through the oxyethylation reaction as shown in the chemical equation 3. Thus, the pH value of the reaction mixture decreases during the reaction.

Such a decrease in the pH value must be prevented by adding a basic substance to the reaction mixture during the reaction.

In this invention, para-hydroxy benzoic acid can be replaced by a reaction product containing the potassium salt of para-hydroxy benzoic acid which is produced by the reaction of potassium phenolate with carbon dioxide called "Kolbe reaction" described in the book entitled "Ullmann," vol. 13, page 92.

In this invention, the hydroxyethylation agents may be used in an amount within the range of 1.1 to 1.4 mols per 1 mol of para-hydroxy benzoic acid, the reaction may be carried at a temperature within the range of 100° C. to 60° C., preferably at about 80° C. and water may be used in an amount within the range of 8 to 50 mols, preferably below 25 mols and more preferably below 20 mols per 1 mol of para-hydroxy benzoic acid. It is not economical to use an hydroxyethylation agent of above 1.4 mols. It is not practical to use the reaction temperature below 60° C. as such a temperature slows down the proceeding of the main reactions and a reaction temperature above 100° C. causes undesirable side reactions. To use a large amount of water causes the undesirable side reaction as shown in the chemical Equation 6, and affects the yield and purity of the resulting para-(β-hydroxyethoxy) benzoic acid.

Table 3 shows the relationship between the amount of water and the yield of para-(β-hydroxyethoxy) benzoic acid when the reaction is carried out by using 1.3 mol of ethylene oxide per 1 mol of para-hydroxy benzoic acid.

TABLE 3

| Mol ratios of water to parahydroxy benzoic acid | Para-(β-hydroxyethoxy) benzoic acid | |
|---|---|---|
| | Yields (percent) | Melting points (° C.) |
| 50 | 87 | 179 |
| 30 | 90 | 180 |
| 25 | 91 | 181 |
| 20 | 93 | 181 |
| 15 | 95 | 181 |
| 8 | 95 | 181 |

When ethylene oxide is used as a hydroxyethylation agent in accordance with this invention the acidic substances such as sulphuric acid, hydrochloric acid, carbon dioxide, sulphur dioxide, para-hydroxy benzoic acid, para-(β-hydroxyethoxy) benzoic acid and a mixture thereof can be used for preventing an increase in pH value and for controlling the pH value of the reaction mixture during the reaction.

When para-(β-hydroxyethoxy) benzoic acid is used as a pH control agent, it reacts with the free sodium hydroxide, which is liberated by the reaction as shown in the chemical reaction 3, to form sodium salt thereof and so it acts to decrease the pH value of the reaction mixture. In addition, the use of the para-(β-hydroxyethoxy) benzoic acid is beneficial for purification of the resulting product as it is not a foreign substance in carrying out the oxyethylation reaction. Also, when para-hydroxy benzoic acid is used, it reacts with sodium hydroxide as the dibasic acid to form disodium salt thereof and so it may be used to control the pH value of the reaction mixture. In addition, the resulting disodium salt is beneficially consumed for the preparation of para-(β-hydroxyethoxy) benzoic acid.

In the ending of the oxyethylation reaction, it is preferably to add a mineral acid or para-(β-hydroxyethoxy) benzoic acid to the reaction mixture but it is not preferable to use the para-hydroxy benzoic acid in the ending of the reaction as it remains in the reaction mixture.

Although the main reactions may be selectively proceeded in accordance with this invention, the side reactions cannot yet be completely avoided.

The inventor also has found the fact that the undesirable effects resulted from the side reaction which is shown by the chemical Equation 4 can be completely avoided by heating the reaction mixture having the pH value above 10, preferably 10.5 to 12.0, at a temperature above 70° C., preferably above 80° C. after the oxyethylation reaction was accomplished.

By applying such a heat treatment, glycol ester produced from the side reaction as shown in the chemical Equation 4 can be hydrolyzed to para-(β-hydroxyethoxy) benzoic acid and ethylene glycol.

The ester type compound in the reaction mixture can be found by the way of the following ester detection test:

95% ethanol and 1 cc. of one normal hydrochloric acid are added to 0.1 gram of the reaction mixture and then one drop of 10% solution of ferric chloride is added thereto (refer to the solution A).

0.5 normal solution of hydroxylamine hydrochloride dissolved in 95% ethanol and 0.2 cc. of 6 normal solution of sodium hydroxide are added to 0.1 gram of the reaction mixture. After the resulting mixture is boiled and then cooled, 2 cc. of one normal hydrochloric acid is added thereto and then 10% solution of ferric chloride is added thereto (refer to the solution B).

That the solution is coloured in the shade of grape juice, or pale reddish violet or the shade of the same colour as that of the solution A, tells that these colors pectively designate two pluses (++), one plus (+) and one minus (−). The increase in the number of uses means the presence of a larger amount of the ester type compound in the reaction mixture.

After the oxyethylation reaction was accomplished such acidic substance as sulphuric acid, hydrochloric acid, carbon dioxide or sulphur dioxide is added to the reaction mixture and then the reaction mixture is cooled for the production of the precipitate of para-β-hydroxyethoxy) benzoic acid. In this case, if desired, the reaction mixture may previously be diluted with water and purified by separating the impurities or treating with active carbon.

The invention is illustrated by the following examples, but not limited thereto.

*Example 1*

A solution was prepared by dissolving 138 grams of para-hydroxy benzoic acid in a mixture of 70 grams of sodium hydroxide and 250 grams of water. The oxyethylation reaction was carried out by bubbling ethylene oxide through said solution at a constant temperature of 70° C. Whenever the pH value of a reaction mixture reached 11.0, it was reduced to 10.5 by adding sulphuric acid thereto. It was found that 98% of phenolic hydroxy group of para-hydroxy benzoic acid was oxyethylated after the total amount of 58 grams of ethylene oxide was bubbled through said solution by maintaining the pH value within the range of 10.5 to 11.0 during the reaction. The ester type compounds contained in the resulting reaction mixture was tested by the ester detection test and found that the ester detection test showed two pluses (++). 200 grams of water was added to the reaction mixture and the reaction mixture increased its pH value to 11.0 and it was heated at a temperature of 90° C. for 30 minutes. After the ester detection test of the reaction mixture indicated one minus (−), the reaction mixture was treated with active carbon and mixed with sulphuric acid to reach pH value 2 and cooled to a temperature of 5° C. thereby to form the crystals. The resulting crystals were filtered, washed with water, dissolved in 3 liters of water at 100° C. and filtered. The filtrate was cooled to 5° C. for recrystalization of para-(β-hydroxyethoxy) benzoic acid. The resulting product was 164 grams of para-(β-hydroxyethoxy) benzoic acid having the melting points of 180° C. and an yield of 90%.

*Example 2*

A solution was prepared by dissolving 100 grams of para-hydroxy benzoic acid in a mixture of 43 grams of sodium hydroxide and 200 grams of water and adjusting the pH value of said solution at 11.0 by adding 50% of an aqueous solution of sodium hydroxide after said solution was heated at 70° C. 72 grams of ethylene chlorohydrin were slowly added to said solution for one hour and the pH value of a reaction mixture was maintained at 10.5±0.2 by adding slowly 50% of an aqueous solution of sodium hydroxide during the reaction. After the addition of ethylene chlorohydrin was accomplished the reaction mixture was heated at 90° C. for 30 minutes and subjected to hot filtration. Sulphuric acid was added to the filtrate and the filtrate was cooled to a temperature of 10° C. thereby to form the crystals of para-(β-hydroxyethoxy) benzoic acid. The resulting crystals were purified as described in Example 1 and 125 grams of para-(β-hydroxyethoxy) benzoic acid having the melting point of 180° C. and an yield of 95% was obtained.

*Example 3*

A solution was prepared by dissolving 139 grams of para-hydroxy benzoic acid in a mixture of 70 grams of sodium hydroxide and 150 grams of water and adjusting the pH value of said solution at 11.0 by adding 50% of an aqueous solution of sodium hydroxide after said solution was heated 75° C. 105 grams of ethylene chlorohydrin were slowly added to said solution for two hours and the pH value of a reaction mixture was maintained at 11.0 for the initial 40 minutes, and then at 10.5 for additional 40 minutes and finally at 10.0 for 40 minutes by adding slowly 50% of an aqueous solution of sodium hydroxide during the reaction. Then the reaction mixture was adjusted to the pH value 11.5 and heated at 85° C. for one hour by agitating and then hydrochloric acid was added to the reaction mixture, which was cooled to a temperature of 10° C. thereby to form the crystals of para-(β-hydroxyethoxy) benzoic acid. The resulting crystals were purified as described in Example 1 and 173 grams of para-(β-hydroxyethoxy) benzoic acid having the melting point of 180° C. and an yield of 95% was obtained.

*Example 4*

A reaction product which is used as the parahydroxy benzoic acid source was obtained by reacting 13.2 kgs. of potassium phenolate with carbon dioxide in an autoclave by agitating the reaction mixture at a temperature of 180° C., at first and then at a temperature of 220° C. for two hours after the introduction of carbon dioxide. This reaction product was dissolved in 25 liters of water and purified by extracting the remaining phenol with benzene and decoloring with active carbon. The solution, thus prepared, contained 8.3 kgs. of para-hydroxy benzoic acid. 3.4 kgs. of ethylene oxide were slowly added to the reaction product for one hour while the pH value of the reaction mixture was maintained at 10–11 by bubbling sulphur dioxide through said reaction mixture and further the reaction mixture was heated at 80° C. for one hour by agitating and then 50 liters of water were added to the reaction mixture. The reaction mixture was subjected to hot filtration and sulphur dioxide was bubbled through the filtrate and cooled to a temperature of 10° C. thereby to separate the solid substance. The resulting solid substance was dissolved in 50 liters of water at a temperature of 120° C. and then cooled to 10° C. for recrystalization of para-(β-hydroxyethoxy) benzoic acid. The resulting crystals were 10.2 kgs. of para-(β-hydroxy) benzoic acid having the melting points of 178° C. and an yield of 93%.

*Example 5*

A solution was prepared by dissolving 138 kgs. of para-hydroxy benzoic acid in a mixture of 75 kgs. of sodium hydroxide and 250 kgs. of water. The oxyethylation reaction was carried out by bubbling 85 kgs. of ethylene oxide into said solution at a temperature of 65° C. by maintaining the pH value of the reaction mixture at 10.5±0.2 by adding 110 kgs. of powdery para-hydroxy benzoic acid for 2 hours. After the charging of para-hydroxy benzoic acid was stopped, additional 13 kgs. of ethylene oxide were bubbled through the reaction mixture having the 10.5 pH value by adding sulphuric acid of 50% concentration. After the charging of ethylene oxide was accomplished, the reaction mixture was heated at 80° C. for one hour by agitating and diluted with 1000 kgs. of water and then sulphuric acid added to the reaction mixture for reducing the pH value of the reaction mixture to 3 and then the reaction mixture was cooled to 10° C. thereby to form the precipitates. The resulting precipitates were filtered, washed with water and dissolved in 3000 kgs. of water and then recrystallized. The purified crystals were 310 kgs. of para-(β-hydroxyethoxy) benzoic acid.

*Example 6*

A solution was prepared by dissolving 138 grams of para-hydroxy benzoic acid in a mixture of 80 grams of sodium hydroxide and 300 grams of water. 100 grams of ethylene oxide, 125 grams of para-hydroxy benzoic acid and 100 grams of water were alternatively added to said solution for 3 hours at a temperature of 75° C. by agitating while the pH value of a reaction mixture was maintained at 10.5±0.2 and then the reaction mixture was heated at 85° C. for 30 minutes. 2000 grams of water, and a mixture of 120 grams of sulphuric acid and 500 grams of water were added to the reaction mixture, which was cooled to 10° C. thereby to form precipitates. The resulting precipitates were filtered, washed with water and dissolved in 3000 grams of water and then recrystallized. The yield of para-(β-hydroxyethoxy) benzoic acid was 95%.

What I claim is:

1. A process for producing para-(β-hydroxyethoxy) benzoic acid which comprises mixing para-hydroxy benzoic acid with ethylene oxide, the mole ratio of para-hydroxy benzoic acid to ethylene oxide being about 1:1.1–1.4, in an aqueous alkaline solution, the mole ratio of para-hydroxy benzoic acid to water being about 1:8–50, and, maintaining the pH of the solution between 10.0 and 11.0 by adding thereto a member selected from the group consisting of hydrochloric acid, sulphuric acid, carbon dioxide, sulphur dioxide, para-hydroxy benzoic acid, para-(β-hydroxyethoxy) benzoic acid and a mixture thereof, and simultaneously heating the solution to a temperature between 60° and 100° C., and then precipitating the thus-formed para-(β-hydroxyethoxy) benzoic acid from the solution.

2. A process for producing para-(β-hydroxyethoxy) benzoic acid, which comprises mixing para-hydroxy benzoic acid with ethylene chlorohydrin in an aqueous alkaline solution, the mole ratio of para-hydroxyl benzoic acid to ethylene chlorohydrin being 1:1.1 to 1.4 and the mole ratio of para-hydroxy benzoic acid to water being 1:8–50 and, during the ensuing reaction, maintaining the pH of the solution between 10.0 and 11.0 by adding alkali, and simultaneously heating the solution to a temperature between 60° and 100° C., and then precipitating the thus-formed para-(β-hydroxyethoxy) benzoic acid from the solution.

3. A method according to claim 2 wherein the alkali is sodium hydroxide.

References Cited by the Examiner

UNITED STATES PATENTS

| | | | |
|---|---|---|---|
| 2,686,198 | 8/1954 | Bock | 260—521 X |
| 2,692,249 | 10/1954 | Lincoln | 260—521 X |
| 3,219,692 | 11/1965 | Petrie | 260—520 |

LORRAINE A. WEINBERGER, *Primary Examiner.*

RICHARD K. JACKSON, *Examiner.*

SIDNEY B. WILLIAMS, *Assistant Examiner.*